UNITED STATES PATENT OFFICE.

WILHELM ELSNER AND OTTO MEYER, OF HANOVER, GERMANY.

PURIFYING RUBBER OR GUTTA-PERCHA.

1,003,244. Specification of Letters Patent. Patented Sept. 12, 1911.

No Drawing. Application filed November 10, 1910. Serial No. 591,682.

*To all whom it may concern:*

Be it known that we, WILHELM ELSNER and OTTO MEYER, citizens of the German Empire, residing at Hanover, Germany, have invented certain new and useful Improvements in Purifying Rubber or Gutta-Percha, of which the following is a specification.

This invention relates to improvements in the manufacture of pure rubber from crude rubber, crude gutta percha, and the like.

The materials brought on to the market under the general name of crude rubber or crude gutta percha, such as "dead Borneo," "Palembang," "Flakes," "Guayquil," etc., generally contain an appreciable quantity of resinous substances which prevent the materials in question from being used without purification. For manufacturing a more or less pure rubber from the crude material the said resinous substances must be removed, and this is generally effected by extraction by means of a liquid which dissolves the resinous substances leaving the rubber in a more or less pure form.

The essential point of the present invention is the extraction of rubber- or caoutchouc-containing substances by means of acetone oils. This term "acetone oils" is generally understood in the trade as covering substances chiefly obtained as by-products in the dry distillation of acetate of calcium for the purpose of manufacturing acetone, and consisting chiefly of a mixture of various aliphatic ketones. The boiling point of these acetone oils is higher than that of the acetone, and consequently it is possible to carry out the extraction at a higher temperature without loss by evaporation of the solvent and thus a quicker and more complete extraction is possible.

As acetone oils, unlike acetone, are practically insoluble in water the extraction of crude rubber or crude gutta percha with these oils offers the following advantages:—

1. The water always contained in the raw material—crude rubber or crude gutta percha—does not pass during the extraction into the acetone oils and therefore can not dilute them and impair their resin-dissolving properties but, being of greater specific gravity, settles under the acetone oils and can be separated from the solution of resin. 2. Water can be added to the acetone oils during the extraction in order to withdraw from the crude material substances such as vegetable acids, salts, albumen, etc., which are insoluble in acetone oil. 3. The water thus added may be mixed with alkalis in order to increase its dissolving action on vegetable acids, albumen, etc.

After the resinous substances have been removed from the crude material the watery solution and the acetone oils containing the resins can be separated from each other easily and the acetone oils can be recovered almost completely.

The addition of other substances, such as alcohols and esters, exercises a favorable influence on the process of extraction of crude rubber with acetone oils.

Another advantage in the use of acetone oils is that they do not exercise any injurious influence on the human skin.

After the treatment of rubber or gutta percha-containing substances with acetone oil by a cold or hot process and with or without the addition of alkaline solutions, alcohols or esters, the rubber or gutta percha remains undissolved while the resinous substances can be obtained from the acetone oil solution containing them by distilling off the solvent.

Having now particularly described and ascertained the nature of our said invention and in what manner the same is to be performed, we declare that what we claim is:—

1. A process for obtaining pure rubber or gutta percha, which consists in extracting the resins and water soluble impurities therefrom by treating the same with acetone oils.

2. The process of purifying rubber or gutta percha which consists in extracting the resins and water-soluble impurities therefrom by treating the same with acetone oils and adding to the said oils water.

3. The process of purifying rubber or gutta percha which consists in extracting the resins and water-soluble impurities therefrom by treating the same with acetone oils and adding to the said oils water, then separating the watery solution of the extracting liquid from the acetone oils containing the resins and then recovering the acetone oils from the resins.

In testimony whereof we affix our signatures in presence of two witnesses.

WILHELM ELSNER.
OTTO MEYER.

Witnesses:
J. M. BOWCOCK,
R. P. THOMPSON.